INVENTOR.
KARL R. M. KARLSTROM
BY
Barnes, Kisselle, Raisch & Choate
ATTORNEYS

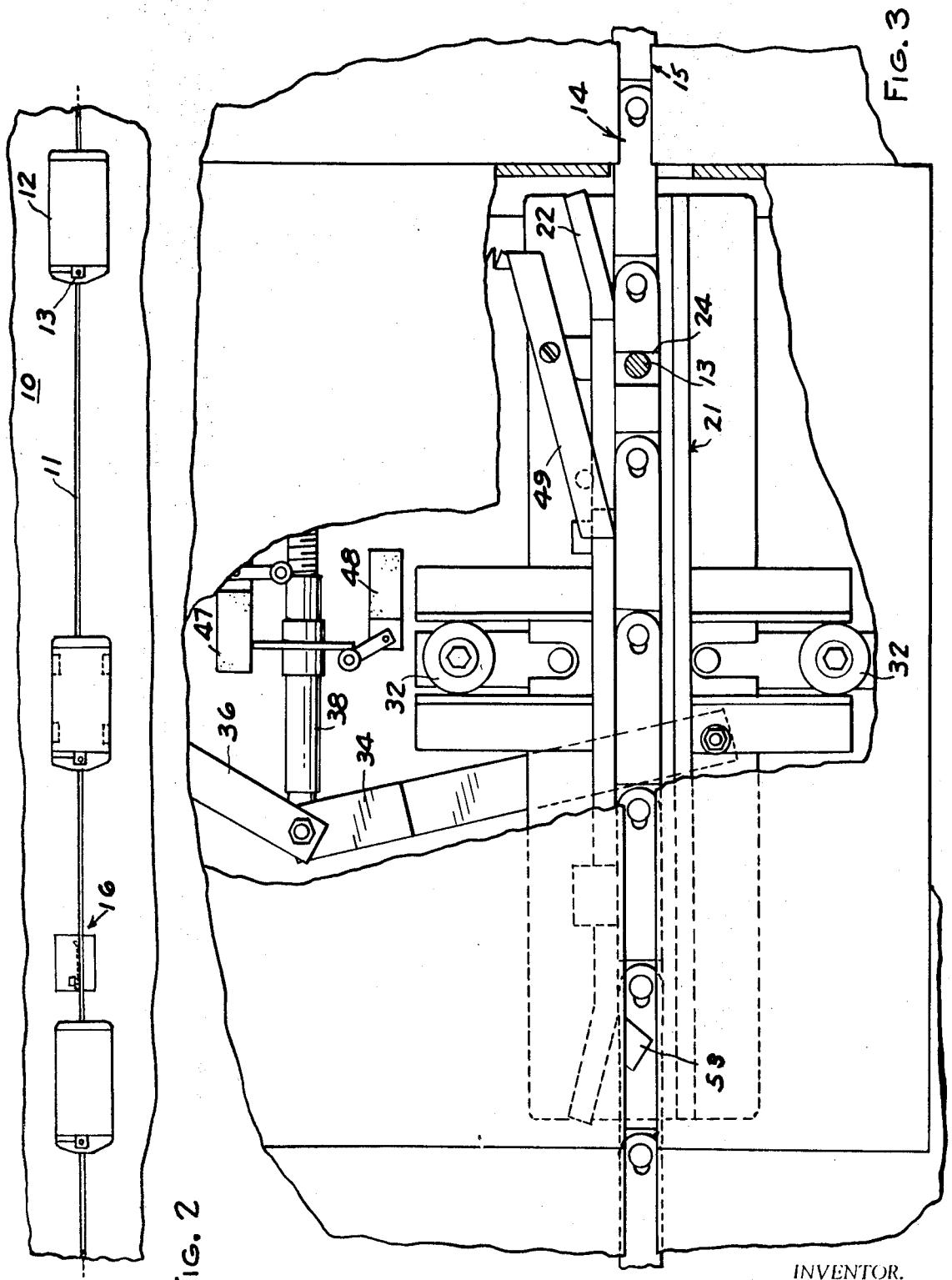

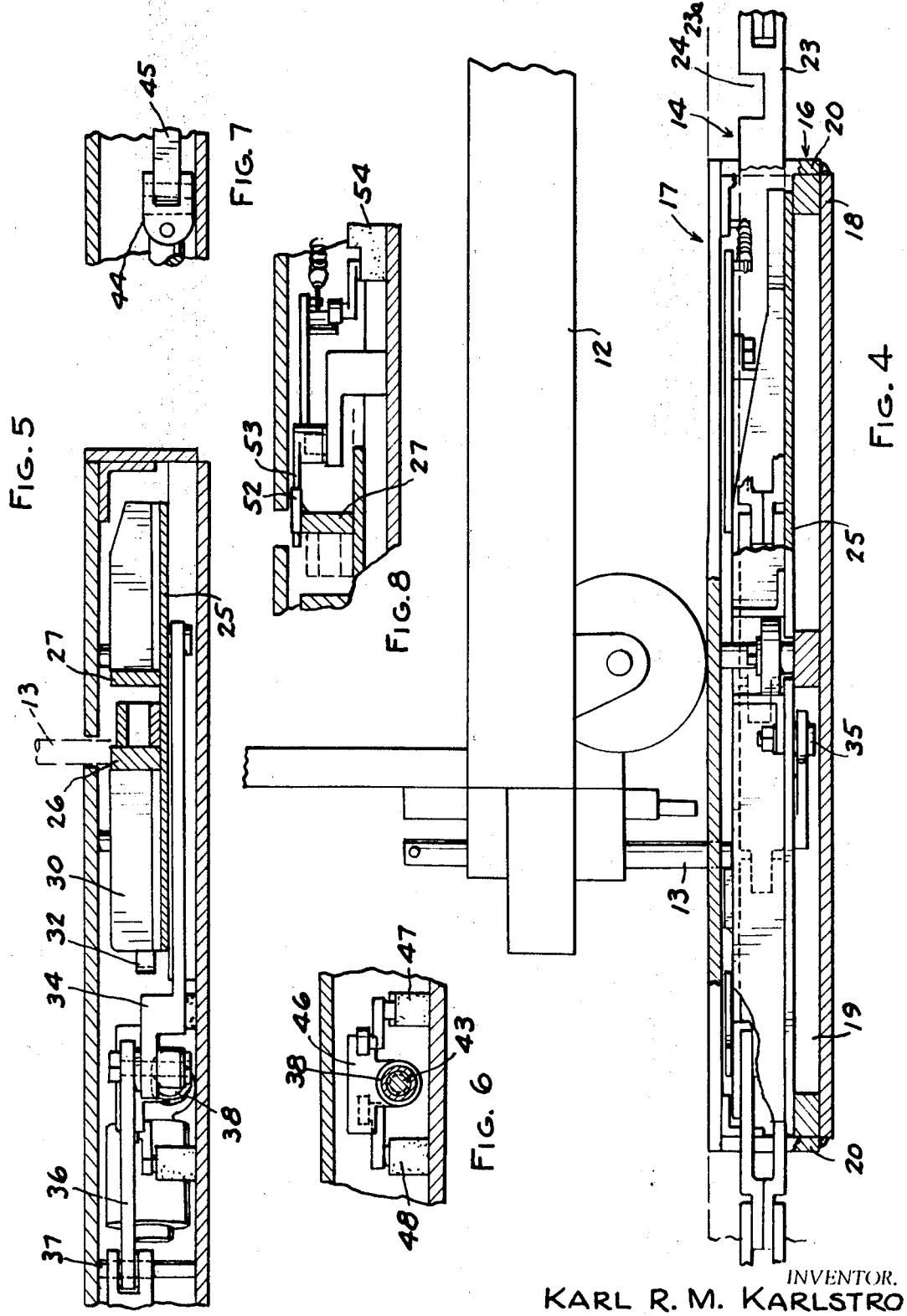

United States Patent Office
3,606,840
Patented Sept. 21, 1971

3,606,840
TOW TRUCK CONVEYOR SYSTEM
Karl R. M. Karlstrom, Roseville, Mich., assignor to American Chain & Cable Company, Inc., New York, N.Y.
Filed Jan. 31, 1969, Ser. No. 795,589
Int. Cl. B65g *17/42*
U.S. Cl. 104—172           15 Claims

ABSTRACT OF THE DISCLOSURE

A tow truck conveyor system comprising a plurality of tow trucks movable along a floor having a slot therein. A conveyor is driven within the floor beneath the slot and has driving means thereon for engaging a tow pin on the tow truck to move the tow truck along. A track is provided for the conveyor and a portion of the track is adapted to be moved laterally to cause the tow pin to engage a cam portion for camming the tow pin upwardly and out of engagement with the driving means on the conveyor.

---

This invention relates to tow truck conveyor systems.

BACKGROUND OF THE INVENTION

In tow truck conveyor systems wherein tow trucks having tow pins thereon are driven by engagement with a conveyor positioned beneath a slot in the floor through which the tow pin extends into engagement with the conveyor, it is often desirable in order to perform various operations on the load on the tow truck to stop the tow truck. One of the main means utilized is to provide means on the tow truck that is operable to lift the tow pin.

Among the objects of the present invention are to provide an apparatus for lifting the tow pin which is operable in the floor rather than on the tow truck; which is relatively simple in construction; which has relatively long life; which will insure the lifting of the tow pin and re-engagement with the conveyor as desired.

DESCRIPTION OF THE DRAWINGS

FIG. 2 is a partly diagrammatic plan view of a tow truck conveyor system embodying the invention.

FIG. 3 is a fragmentary part sectional view similar to FIG. 1 showing the parts in a different operative position.

FIG. 4 is a fragmentary sectional view taken along the line 4—4 in FIG. 1.

FIG. 5 is a fragmentary sectional view taken along the line 5—5 in FIG. 1.

FIG. 6 is a fragmentary sectional view taken along the line 6—6 in FIG. 1.

FIG. 7 is a fragmentary sectional view taken along the line 7—7 in FIG. 1.

FIG. 8 is a fragmentary sectional view taken along the line 8—8 in FIG. 1.

DESCRIPTION

Figure 1:
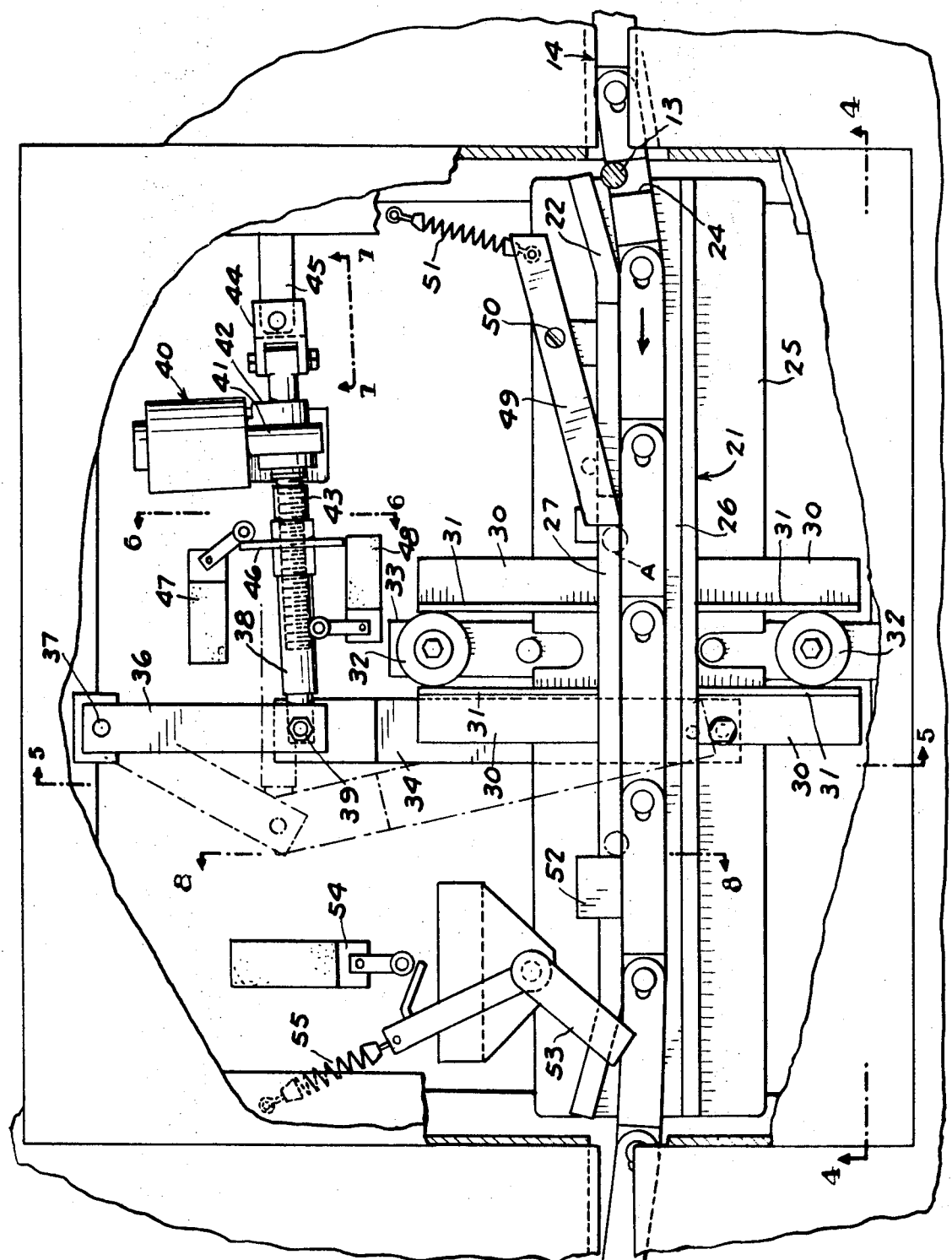
FIG. 1 is a fragmentary part sectional view of a portion of a tow truck conveyor system embodying the invention.

Referring to FIG. 2, the tow truck conveyor system embodying the invention comprises a floor 10 having a slot 11 along which tow trucks 12 are adapted to be driven by engagement of tow pins 13 on the tow trucks 12 with a conveyor chain 14 driven along a track 15 beneath the floor 10 and the slot 11 (FIGS. 2 and 3).

At one point along the slot 11, a mechanical stop apparatus 16 is provided. The mechanical stop apparatus comprises a housing 17 including a bottom wall 18, side walls 19 and end walls 20 (FIG. 4). The apparatus 16 includes a track section 21 (FIGS. 1 and 2) which is movable laterally with respect to the direction of longi- tudinal movement of the chain along the track and in a plane parallel to the floor and is adapted to move the chain conveyor 14 and cause the tow pin 13 to be cammed upwardly by a cam portion 22, as presently described.

Referring to FIG. 4, the conveyor chain 14 comprises links 23 that are pivoted to one another. At least some of the upper links 23a have a recess 24 (FIGS. 1 and 3) for engaging the tow pin 13 to drive the tow pin and, in turn, the tow truck along the floor.

Track section 21 comprises a base plate 25 and spaced walls 26, 27 that define a U-shaped track (FIG. 5). The trailing end of the wall 27 is tapered upwardly and forwardly to form the cam 22. When the track section 21 is moved from the normal position shown in FIG. 3 to the position shown in FIG. 1, as the chain conveyor 14 moves along, the tow pin 13 engages the inclined cam 22 and is forced upwardly onto the cam 22 to the position A as shown in broken lines in FIG. 1.

In this position, pin 13 partially overlaps the cam 22 and wall 27 of track 21. At this point, the tow pin 13 is out of driving engagement with the chain conveyor 14. When it is desired to re-engage the tow pin 13 with the chain conveyor 14, the track section 21 is moved from the position shown in FIG. 1 to the position shown in FIG. 3 permitting the tow pin 13 to drop downwardly for engagement with a succeeding slot 24 of the chain conveyor 14.

As shown in FIGS. 1, 2 and 4, means are provided for guiding the transverse movement of the track section 21 and comprise angle members 30 mounted on the plate 25 and having their vertical walls 31 engaging rollers 32 that are mounted for rotation about vertical axes on a bar 33 fastened to the bottom wall 18 of the housing 16.

The means for moving the track section 21 laterally of the longitudinal direction of movement of the chain conveyor 14 comprises a mechanism that includes a connector bar 34 pivoted at one end to the plate 25 by a bolt 35 and a connector bar 36 pivoted at one end to the housing as at 37. The inner ends of the connector bars 34, 36 are pivoted to one another and to an actuating member 38 of an actuator 40 by a bolt 39. The actuator 40 is of the linear actuator type and comprises a worm 41 that rotates a gear 42 on which a shaft 43 is fixed and is threaded into the member 38. By rotating the shaft 43, it is threaded into and out of the actuating member 38. The linear actuator 40 is pivoted to a clevis 44 that, in turn, is pivoted to a support 45 fixed on the housing 16. The actuating member 38 has a collar 46 thereon which is adapted to actuate limit switches 47, 48 for limiting the extreme degrees of movement of the actuator and, in turn, of the track section 21.

In order to prevent retrograde or rearward movement of the tow pin after it has been moved upwardly onto the cam surface 22, a lever 49 is pivoted to the slide assembly 21 as at 50 and has a spring 51 yieldingly urging the forward end thereof into the path of the tow pin 13. Similarly, a stop 52 is fixed on the wall 27 to prevent inadvertent forward movement of the tow pin 13 when the tow pin 13 has been elevated.

After re-engagement of the tow pin 13 with the chain conveyor and movement of the tow pin out of the area of the mechanical stop, a lever 53 is actuated to, in turn, actuate another limit switch 54. Lever 53 is yieldingly urged into the path of the tow pin by spring 55. The limit switch 54 actuates a signal which confirms the fact that the tow pin has been reengaged with the chain.

What is claimed is:

1. In a tow truck conveyor system wherein a plurality of tow trucks are provided, each having a tow pin extending downwardly through a slot in the floor, the combination comprising
- a chain track adapted to be positioned beneath said slot,
- a conveyor chain extending and driven along said chain track,
- said chain having tow pin engaging means thereon,
- a portion of said chain track being movable laterally with respect to the direction of longitudinal movement of the chain along the track and in a plane parallel to the floor,
- tow pin directing means associated with said movable track portion and movable therewith to and from positions into and out of the path of the tow pin as it approaches the movable portion,
- and means for moving said movable portion to and from said positions,
- said track having a generally inverted U-shaped cross section including base and leg portions,
- said tow pin directing means comprising a cam portion on the upper part of one of said leg portions,
- said cam portion having a width such that when the track portion is moved out of the normal path of the tow pin, said cam portion partially overlaps the normal path of the tow pin.

2. The combination set forth in claim 1 wherein said track portion has the trailing leg portions thereof flared outwardly,
- the adjacent portions of the chain track having generally outwardly flared end portions adjacent the movable portion.

3. In a tow track conveyor system wherein a plurality of tow trucks are provided, each having a tow pin extending downwardly through a slot in the floor, the combination comprising
- a chain track adapted to be positioned beneath said slot,
- a conveyor chain extending and driven along said chain track,
- said chain having tow pin engaging means thereon,
- a portion of said chain track being movable laterally with respect to the direction of longitudinal movement of the chain along the track and in a plane parallel to the floor,
- tow pin directing means associated with said movable track portion and movable therewith to and from positions into and out of the path of the tow pin as it approaches the movable portion,
- and means for moving said movable portion to and from said positions,
- said means for moving said track portion comprising a toggle mechanism,
- said toggle mechanism comprising a pair of levers pivoted to one another at one end,
- the other end of one of said levers being pivoted to said track portion,
- the other end of the other said lever being pivoted to a fixed portion,
- and means connected to said pivot between said levers for operating said levers.

4. The combination set forth in claim 3 wherein said last-mentioned means comprises a linear actuator.

5. In a tow truck conveyor system wherein a plurality of tow trucks are provided, each having a tow pin extending downwardly through a slot in the floor, the combination comprising
- a chain track adapted to be positioned beneath said slot,
- a conveyor chain extending and driven along said chain track,
- said chain having tow pin engaging means thereon,
- a portion of said chain track being movable laterally with respect to the direction of longitudinal movement of the chain along the track and in a plane parallel to the floor,
- tow pin directing means associated with said movable track portion and movable therewith to and from positions into and out of the path of the tow pin as it approaches the movable portion,
- and means for moving said movable portion to and from said positions,
- means for guiding said movable track portion,
- said last-mentioned means comprising guideways,
- and rollers on said track portion movable therewith and engaging said guideways.

6. In a tow truck conveyor system wherein a plurality of tow trucks are provided, each having a tow pin extending downwardly through a slot in the floor, the combination comprising
- a chain track adapted to be positioned beneath said slot,
- a conveyor chain extending and driven along said chain track,
- said chain having tow pin engaging means thereon,
- a portion of said chain track being movable laterally with respect to the direction of longitudinal movement of the chain along the track and in a plane parallel to the floor,
- tow pin directing means associated with said movable track portion and movable therewith to and from positions into and out of the path of the tow pin as it approaches the movable portion,
- and means for moving said movable portion to and from said positions,
- means on said track portion for preventing retrograde movement of the tow pin therein,
- said last-mentioned means comprising a lever pivoted intermediate its ends,
- and spring means yieldingly urging one end of said lever into the path of the tow pin.

7. For use in a tow truck conveyor system including a plurality of tow trucks, each having a tow pin extending downwardly through a slot in the floor, a chain track adapted to be positioned beneath said slot, and a conveyor chain extending and driven along said chain track, said chain having tow pin engaging means thereon,
- a stop mechanism comprising
- a housing,
- a track section,
- means for mounting said track section in said housing for movement laterally with respect to the direction of longitudinal movement of the chain along the track and in a plane parallel to the floor,
- tow pin directing means associated with said movable track section and movable therewith to and from positions into and out of the path of the tow pin as it approaches the movable section;
- and means for moving said movable section to and from said positions,
- said track having a generally inverted U-shaped cross section,
- said tow pin directing means comprising a cam portion on the upper part of one of said leg portions,
- said cam portion having a width such that when the track portion is moved out of the normal path of the tow pin, said cam portion partially overlaps the normal path of the tow pin.

8. The combination set forth in claim 7 wherein said track portion has the trailing leg portions thereof flared outwardly.

9. For use in a tow truck conveyor system including a plurality of tow trucks, each having a tow pin extending downwardly through a slot in the floor, a chain track adapted to be positioned beneath said slot, and a conveyor chain extending and driven along said chain track, said chain having tow pin engaging means thereon,
- a stop mechanism comprising
- a housing,
- a track section,
- means for mounting said track section in said housing for movement laterally with respect to the direction of longitudinal movement of the chain along the track and in a plane parallel to the floor, tow pin directing means associated with said movable track section and movable therewith to and from positions into and out of the path of the tow pin as it approaches the movable section, and means for moving said movable section to and from said positions, said means for moving said track portion comprising a toggle mechanism, said toggle mechanism comprising a pair of levers pivoted to one another at one end, the other end of one of said levers being pivoted to said track portion, the other end of the other said lever being pivoted to a fixed portion, and means connected to said pivot between said levers for operating said levers.

10. The combination set forth in claim 9 wherein said last-mentioned means comprises a linear actuator.

11. For use in a tow truck conveyor system including a plurality of tow trucks, each having a tow pin extending downwardly through a slot in the floor, a chain track adapted to be positioned beneath said slot, and a conveyor chain extending and driven along said chain track, said chain having tow pin engaging means thereon,
 a stop mechanism comprising
 a housing,
 a track section,
 means for mounting said track section in said housing for movement laterally with respect to the direction of longitudinal movement of the chain along the track and in a plane parallel to the floor,
 tow pin directing means associated with said movable track section and movable therewith to and from positions into and out of the path of the tow pin as it approaches the movable section,
 and means for moving said movable section to and from said positions,
 means for guiding said movable track portion,
 said last-mentioned means comprising guideways in said housing,
 and rollers on said track portion movable therewith and engaging said guideways.

12. For use in a tow truck conveyor system including a plurality of tow trucks, each having a tow pin extending downwardly through a slot in the floor, a chain track adapted to be positioned beneath said slot, and a conveyor chain extending and driven along said chain track, said chain having tow pin engaging means thereon,
 a stop mechanism comprising
 a housing,
 a track section,
 means for mounting said track section in said housing for movement laterally with respect to the direction of longitudinal movement of the chain along the track and in a plane parallel to the floor,
 tow pin directing means associated with said movable track section and movable therewith to and from positions into and out of the path of the tow pin as it approaches the movable section,
 and means for moving said movable section to and from said positions,
 means on said track portion for preventing retrograde movement of the tow pin therein,
 said last-mentioned means comprising a lever pivoted intermediate its ends,
 and spring means yieldingly urging one end of said lever into the path of the tow pin.

13. In a tow truck conveyor system wherein a plurality of tow trucks are provided, each having a tow pin extending downwardly through a slot in the floor, the combination comprising a chain track adapted to be positioned beneath said slot, a conveyor chain extending and driven along said chain track, said chain having tow pin engaging means thereon, a portion of said chain track being movable laterally with respect to the direction of longitudinal movement of the chain along the track and in a plane parallel to the floor, tow pin directing means associated with said movable track portion and movable therewith to and from positions into and out of the path of the tow pin as it approaches the movable portion, said tow pin directing means comprising cam means operable when the track portion is moved out of the normal path of the tow pin to partially overlap the normal path of the tow pin and be engaged by the tow pin to move the tow pin upwardly out of the engagement with said chain, and means for moving said movable portion to and from said positions.

14. For use in a tow truck conveyor system including a plurality of tow trucks, each having a tow pin extending downwardly through a slot in the floor, a chain track adapted to be positioned beneath said slot, and a conveyor chain extending and driven along said chain track, said chain having tow pin engaging means thereon,
 a stop mechanism comprising
 a housing,
 a track section,
 means for mounting said track section in said housing for movement laterally with respect to the direction of longitudinal movement of the chain along the track and in a plane parallel to the floor,
 tow pin directing means associated with said movable track section and movable therewith to and from positions into and out of the path of the tow pin as it approaches the movable section,
 said tow pin directing means comprising cam means operable when the track portion is moved out of the normal path of the tow pin to partially overlap the normal path of the tow pin and be engaged by the tow pin to move the tow pin upwardly out of the engagement with said chain,
 and means for moving said movable section to and from said positions.

15. For use in a tow truck conveyor including a plurality of tow trucks, each having a tow pin extending downwardly through a slot in the floor, and a conveyor chain extending and driven along said slot, said chain having tow pin engaging means thereon,
 means for moving a portion of said chain laterally with respect to the direction of longitudinal movement of the chain along the track and in a plane parallel to the floor,
 and tow pin directing means associated with said last-mentioned means for movement into and out of the path of the tow pin,
 said tow pin directing means comprising cam means operable when the track portion is moved out of the normal path of the tow pin to partially overlap the normal path of the tow pin and be engaged by the tow pin to move the tow pin upwardly out of the engagement with said chain.

References Cited

UNITED STATES PATENTS

| | | | |
|---|---|---|---|
| 3,088,419 | 5/1963 | Bishop | 104—172 |
| 3,223,048 | 12/1965 | Gorjanc | 104—102 |
| 3,520,255 | 7/1970 | Hefler | 104—172 |

ARTHUR L. LA POINT, Primary Examiner

R. SAIFER, Assistant Examiner